US007575164B2

(12) United States Patent
Reardon

(10) Patent No.: US 7,575,164 B2
(45) **Date of Patent: *Aug. 18, 2009**

(54) COMPUTER ENHANCED VOTING SYSTEM INCLUDING VOTER VERIFIABLE, CUSTOM PRINTED BALLOTS IMPRINTED TO THE SPECIFICATIONS OF EACH VOTER

(76) Inventor: David C. Reardon, 7346 Spruce Hill, Dardenne Prairie, MO (US) 63368

( * ) Notice: Subject to any disclaimer, the term of this patent is extended or adjusted under 35 U.S.C. 154(b) by 0 days.

This patent is subject to a terminal disclaimer.

(21) Appl. No.: 11/827,517

(22) Filed: Jul. 12, 2007

(65) Prior Publication Data

US 2008/0041949 A1 Feb. 21, 2008

Related U.S. Application Data

(63) Continuation of application No. 10/013,277, filed on Dec. 12, 2001, now Pat. No. 6,968,999.

(60) Provisional application No. 60/258,346, filed on Dec. 28, 2000.

(51) Int. Cl.
*G06K 17/00* (2006.01)

(52) U.S. Cl. ...................................... 235/386; 235/375

(58) Field of Classification Search ................. 235/286, 235/375, 51, 51 R, 51 B; 705/12
See application file for complete search history.

(56) References Cited

U.S. PATENT DOCUMENTS

| | | | |
|---|---|---|---|
| 4,010,353 | A | 3/1977 | Moldovan et al. |
| 4,015,106 | A | 3/1977 | De Philliopo |
| 4,021,780 | A | 5/1977 | Narey et al. |
| 4,236,066 | A | 11/1980 | Olmstead et al. |
| 4,717,177 | A | 1/1988 | Boram |
| 4,774,665 | A | 9/1988 | Webb |
| 5,189,288 | A | 2/1993 | Anno et al. |
| 5,610,383 | A | 3/1997 | Chumberley |
| 5,875,432 | A | 2/1999 | Sehr |
| 6,081,793 | A | 6/2000 | Challener et al. |
| 6,092,051 | A | 7/2000 | Kilian et al. |
| 6,250,548 | B1 | 6/2001 | McClure et al. |
| 6,412,692 | B1 | 7/2002 | Miyagawa |
| 6,540,138 | B2 | 4/2003 | Hall et al. |
| 6,769,613 | B2 | 8/2004 | McDermott et al. |
| 6,799,723 | B2 | 10/2004 | Kotob et al. |

(Continued)

FOREIGN PATENT DOCUMENTS

IT 1234224 A2 6/1992

*Primary Examiner*—Daniel St.Cyr

(57) ABSTRACT

An apparatus and method for creating and recording both an electronic and printed ballot for each voter during voting. The system can employ a variety of vote selection techniques, all of which can lead to the generation of an electronic tally of the vote in addition to the printing of a paper ballot. The printed ballot includes only the names of the candidates for whom the voter has voted in a form that is easily readable by both humans and machine. This unambiguous printed ballot makes it easy for voters to verify the accuracy of their intended vote and can subsequently be used to cast the voter's official vote or saved to provide an audit trail for subsequent confirmation of the electronic tally. These and other features accelerate the initial tabulation of results while providing multiple safeguards against fraud through the printing of a paper record for verifying voter intent.

18 Claims, 2 Drawing Sheets

U.S. PATENT DOCUMENTS 6,968,999 B2 * 11/2005 Reardon ..................... 235/386
7,243,846 B2 * 7/2007 Reardon ..................... 235/386
2001/0013547 A1 8/2001 Kotob et al.
2001/0042005 A1 11/2001 McClure et al.

* cited by examiner

COMPUTER ENHANCED VOTING SYSTEM INCLUDING VOTER VERIFIABLE, CUSTOM PRINTED BALLOTS IMPRINTED TO THE SPECIFICATIONS OF EACH VOTER

This present application is a continuation application of U.S. patent application Ser. No. 10/013,277, filed Dec. 12, 2001 now U.S. Pat. No. 6,968,999, entitled "A Computer Enhanced Voting System Including Verifiable, Custom Printed Ballots Imprinted to the Specifications of Each Voter," which claims priority to Provisional Patent Application Ser. No. 60/258,346, filed Dec. 28, 2000, entitled "A Computer Enhanced Voting System Including Verifiable, Custom Printed Ballots Imprinted to the Specifications of Each Voter."

BACKGROUND OF THE INVENTION

This invention relates in general to electronic voting systems and more specifically to a voting system that includes a system to record a voter's selections on a custom printed ballot for verification by the voter at the time a voter casts his or her ballot.

The presidential election of 2000 illustrated the hazards of punch card ballots and the uncertainty of verifying voter intent. Indeed, since punch card ballots are not easily read by voters, there were many voters who subsequently felt disenfranchised based on the fear that their intended vote was not accurately recorded.

This national controversy revealed that there is the need for a method to cast ballots that is (1) easy for humans to read, so that both voters and election officials can verify the accuracy of the cast vote, (2) easy for machines to read for the purpose of automating the count, and (3) provides for multiple paths of verification.

A number of electronic voting methods have been devised (De Phillipo, U.S. Pat. No. 4,015,106, Narey et al., U.S. Pat. No. 4,021,780, and Moldovan, Jr. et al., U.S. Pat. No. 4,010,353, Challener, et al. U.S. Pat. No. 6,081,793, Kilian, et al. U.S. Pat. No. 6,092,051) but these have proven to be too expensive or cumbersome for widespread use.

Many of these new technologies seek to replace the paper ballot with secure digital records. While the electronically cast votes are easy to count and transmit, public confidence in a voting system will be undermined in any system that lacks a physical paper record. A paper record, also known as a ballot, is tangible evidence of the cast vote and may be considered as an essential element in the verification of computer tallies.

This invention relates in general to a voting system that combines the speed and accuracy of computer technology with the advantages of custom printed paper ballots in a novel fashion that produces numerous advantages in terms of speed, ease of use, and multiple levels of verification.

SUMMARY OF THE INVENTION

A voting system is disclosed, according to one embodiment of the present invention, for use by voters to cast ballots therein during an election. The voting system includes an electronic precinct computing unit that is connected to a selection entry device by which the voter enters his select on of votes and a printer device by which a paper record, which may be used as the official cast ballot, is generated that identifies in an unambiguous fashion the votes cast in a form that is easily readable by both humans and an appropriate scanning machine that would be used for an automated tallying of the custom printed ballots. In addition, as an enhancement of the basic invention, the precinct computing unit may store an electronic record of the cast votes in a removable memory unit that may subsequently be transported to a central location and/or be networked via the Internet or a closed computer network to a central headquarters computer. By these additional components, a computer generated tally of the votes may be computed prior to the scanning of the printed ballots and used for the announcement of the initial results, subject to verification of the results by scanning of the printed ballots. By use of a unique ballot number and a printed receipt, it is also possible for a voter to subsequently confirm that the voter's intended vote was properly included in the final tally and to even identify the printed ballot in the event that allegations of fraud arise.

DETAILED DESCRIPTION OF THE PREFERRED EMBODIMENT OF THE INVENTION

Figure 1:
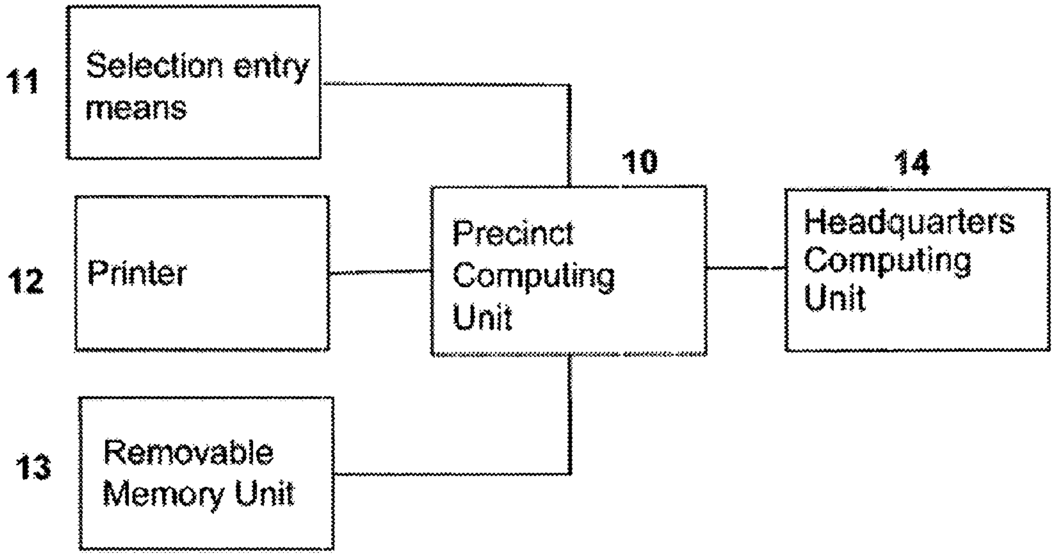
FIG. 1 is a block diagram of an electronic voting system according to one embodiment of the present invention that illustrates the relationship between the key elements.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, the precinct computing unit 10 is a basic computing device, perhaps even a standard computer, that is pre-programmed with a list of all the possible votes that can be cast on that voting day for that particular precinct. It is connected to a voter operated input device, the selection entry device 11, and a printer 12 by which the voter's ballot will be printed once the voter's selections are completed. The printer, in customary fashion, may include a paper feeder 12A to feed paper into and out of the printer device.

The interconnection between the precinct computing unit, the selection entry device, and the printer can be in any of many configurations that will be obvious to those skilled in the art. The three components might be built into a single box and hardwired together. Alternatively, the selection entry device and the printer could be built as a single unit of which several could then be placed into individual private voting booths that are networked to the precinct computing unit. Alternatively, each voting booth might have only the selection entry device (for example, a touch screen displaying the candidates) but the printer would be located at the voting judges table. Any of a number of similar configurations could be arranged. The only essential requirement is that these components of the system must have a communication link between them, either through hardwiring, a network, or through an optical or radio link.

Similarly, the selection entry device 11 can be one of many well known devices, for example, a numeric keypad, an alphanumeric keyboard, a touch screen, a bar code reader or similar scanning device. Through this configuration the voter may either enter individual selections or may enter the code for a pre-selected slate of votes.

Figure 2:
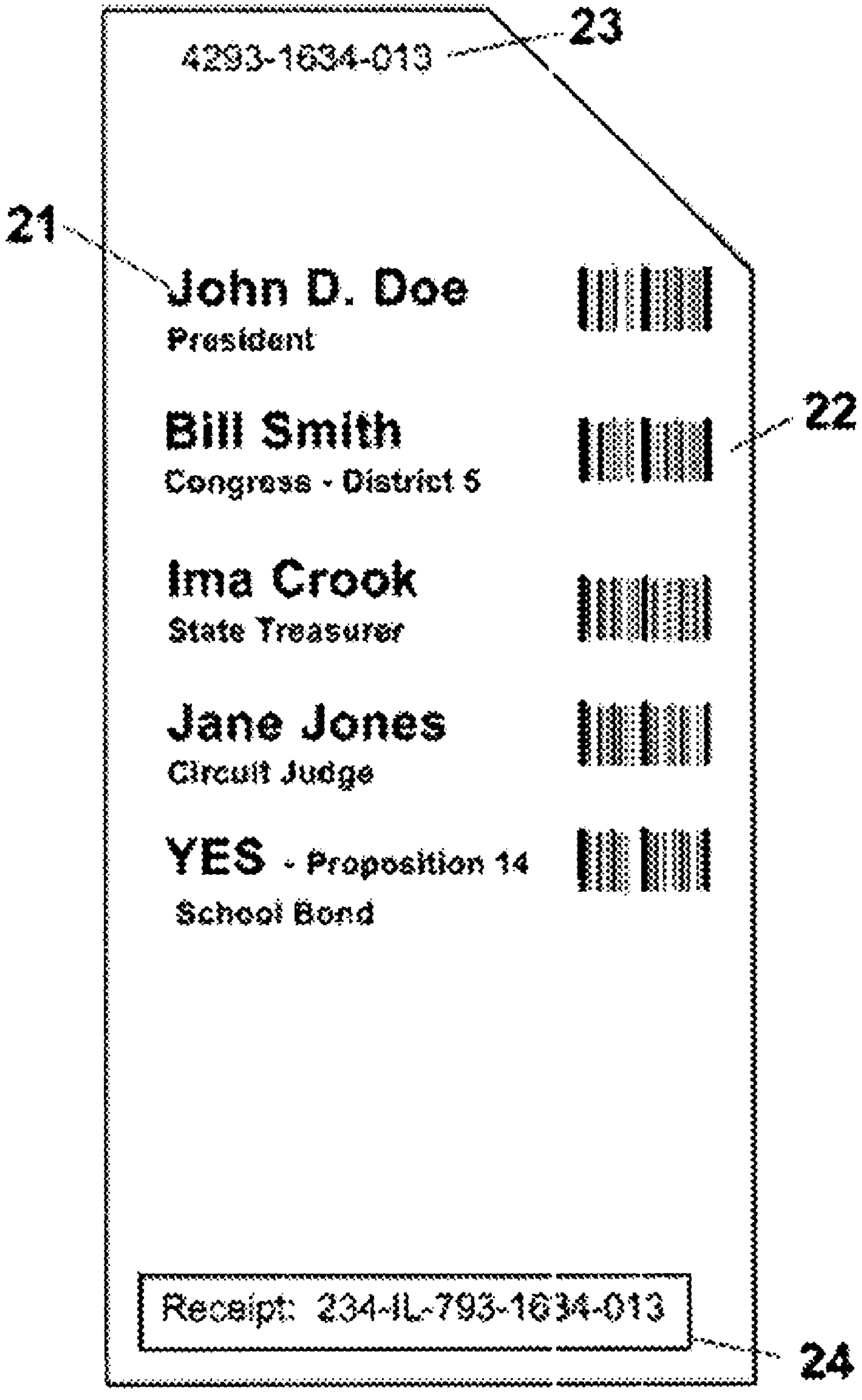
FIG. 2 is an illustration of a printed record, commonly called a ballot, according to one embodiment of the present invention. Generally, the medium on which the printed record will be paper, but obviously any printable medium could be used.

In most voting systems, voters are presented with an identical ballot. The key innovation in this invention, however, is that a voter verified, custom printed ballot is generated for each voter before it is officially cast. FIG. 2 illustrates a typical embodiment of a custom printed ballot. In this example, only the names of the candidates actually selected by the voter 21 are printed on the paper record, which constitutes the custom printed ballot. Competing, but non-selected candidates' names are omitted. This makes it easy for the voter to verify the accuracy of the printed paper record with a quick glance at the printed list of names. Typically, the names would be printed in larger bolder letters with the office being filled printed in smaller letters beneath the name. For referenda, a proposition number would be printed with "YES" or "NO" clearly indicated. Alternatively, if state law required all candidates' names to be on the ballot, the selected name could be printed in large bold font while the unselected names could be printed in very small font.

The printing of the ballot may also include two additional options. First, to facilitate machine reading of the ballot, a unique bar code or other machine readable code 22 unique to each candidate or vote might also be printed at an appropriate place on the printed record. Another option would include printing a unique ballot identification number on the ballot 23 as well as upon a receipt 24 to be given to the voter. In FIG. 2, the receipt 24 is in the form of a peel off label affixed to the ballot that can be easily removed and given to the voter. A perforated, tear off receipt might also be conveniently used, or separate receipt might be printed on a second ballot clearly marked as a receipt and lacking the machine readable codes, so as to prevent it from being used to cast an additional vote. By whichever of many ways that a receipt is printed, this receipt may subsequently be used by the voter, as described elsewhere, to confirm that the votes were properly tallied in the final count or in an investigation of vote tampering.

Using an appropriate scanning machine, the printed records can subsequently be tallied in a rapid and consistent manner. In the event that the bar code is unreadable, either an optical character recognition scanner may be employed to read the printed names or the ballot may be automatically segregated for examination by election officials.

In a typical application, the count of the printed ballots would be used for the final certified results since the printed ballots have more evidentiary value than a purely electronic tally that may be subject to software glitches, data loss, computer hacking, black outs, fraudulent reporting or other errors that undermine voter confidence. On the other hand, a purely electronic tally of the cast votes can also be easily generated by one or both of the following techniques.

By establishing a communication link between the precinct computing unit and a county, state, or federal central headquarters computing unit 14 (via the Internet, for example), all votes on every ballot cast at the precinct may be transmitted to the central headquarters either in real time or after the polls close. Also, or alternatively, an electronic record of all the cast ballots may be stored on a removable memory unit 13 which can be transported to the county's vote commission, for example. At the county level, in this example, all the memory units from the many precincts could be downloaded into a central computer and instantly tabulated. The results of this count would then be subject to verification by a machine count of the printed ballots.

The combination of an electronic selection process and a custom printed ballot produces a large number of unexpected advantages some of which are discussed herein.

For example, while this voting system can be used in the traditional manner, voters coming to the precinct and making their selections on a case by case basis, it can also accommodate the quick casting of a pre-selected slate of candidates. For example, a few days before the election, voters who want to avoid waiting in line at the precinct could log onto an internet site for their precinct. On that web site, the voter would be presented with a web based virtual ballot that includes all the contests and candidates. The precinct might even include with each candidates name a link to that candidate's campaign web sight to help the voters to research their choices. By filling in the ballot, the voter can pre-cast his votes. When finished, the voter would be provided a code number, or can print out a scanable code, that identifies the slate of votes he intends to cast. This number is not unique to that voter, but simply corresponds to that particular slate of votes. Another voter casting the identical vote would be given the same code number. If the voter is still uncertain about some of his selections, he can even print out several code numbers corresponding to different slates. Exploiting this same advantage, political parties could publish the code number or scanable code for their recommended slate. The voter could then take this pre-published code to the voting booth and cast votes for his party's slate with virtually no thought at all.

With the selection already determined in the fashion described above, the voter only needs to go to the precinct on the election day. There, the election officials will verify his identity and he can enter and enter the code number in the selection entry device, or have the pre-printed bar code scanned by the selection entry device. The completed ballot is printed out, read by the voter to verify the accuracy of the selections, and the voter verified, custom printed ballot is then cast.

To better ensure that voters do not mistakenly fail to vote for an office, "NO VOTE" might be printed above the name of offices for which no vote was cast. Voters would then see this after the ballot is printed and could decide whether to void the ballot or to cast it, as is. In addition, since the entry of the selections is entered into a programmable electronic device, it is a simple matter for the program to refuse to accept multiple selections for a single office, thereby eliminating the risk of "over count" errors. Entry of multiple candidates for a single office would result in prompts asking the voter to select only a single candidate or no candidate.

Write-in candidates can also be accommodated. One method would be to allow voters to simply select "WRITE-IN" as their choice. The ballot would be printed with "WRITE-IN" printed adjacent to the office for which the write-in is selected and with space for the voter to print in the name of his or her write-in choice. During the scanning process, all ballots with write-in votes could be automatically segregated and write-in votes hand tallied. Alternatively, if the selection of candidates is done through a computer terminal, a choice for a write-in candidate could bring up a subroutine that allows the voter to type in the name of the write-in candidate. This name could then be printed on the ballot at the appropriate place. In addition, an identifying code could be assigned to that write-in candidate and electronically registered with the central office, printed on the ballot as a bar code, and reused if other voters enter the same write-in name.

Additional methods for election officials to witness the validity of the cast ballot may also be employed. For example, if blank cards on which the record of votes will be printed are presented to each voter, the election judges can initial the front or back of the blank ballot card before it is printed. Alternatively, if a large quantity of blank ballots sheets are placed into a paper feeding device for the printer, the ballots can be initialed or imprinted with a machine readable election judge confirmation code after it is printed and presented to the election judges.

If a ballot is miscast or spoiled prior to its deposit in the ballot box, there are at least three simple alternatives for voiding the ballot. First, it could be marked as void and placed into a voided ballot box. Ballots from this box would be scanned before or slightly after the polls close so that the votes on these ballots could be deducted from the preliminary computer tally. Alternatively, the precinct computing device would provide a mechanism by which the election judges could enter the unique ballot identification number into the system which would then automatically void that ballot and all votes associated with it. The voter would then be allowed to cast a new ballot. By keeping the receipts for both ballots, the voter could subsequently check to verify that the voided ballot was voided and the properly cast ballot was counted. Thirdly, the ballot could be run back through the printer which would print voiding codes on the front and or back of the ballot but the electronic tally is not adjusted. The voided ballot is then either placed in a separate voided ballot box (record keeping container) 16 or in the regularly cast ballot box (record keeping container) 18. In the latter case, since it is marked void in a fashion that will be easily sported by the scanner, the votes on the voided ballot will not be counted toward the official tally but would be counted toward the voided ballots tally. When the totals of the official tally and the voided ballots tally are combined these numbers should, of course, equal the preliminary electronic tally. In this latter alternative, no effort is made to correct the preliminary electronic tally. If the number of voided ballots is generally small, this is unlikely to have an impact on the preliminary interpretation of the results. In any event, the official count of the ballots, as described, would account for both valid and voided ballots.

In the description of the preferred embodiment, the assumption is made that the custom printed paper ballot represents the true vote and the initial electronic tally is simply used to report a preliminary count. In some jurisdictions, however, an electronic tally might be accepted as the official count unless the vote is contested. This approach would have the advantage of eliminating the costs involved in routinely scanning the paper ballots. In such cases, the printed ballots would simply be stored in a secure location for the period of time allowed for filing a challenge against the reported tally. If the electronic count is challenged, the printed ballots could be retrieved for either a partial or full hand or machine count.

The option of allowing individual voters to verify the casting of his or her votes is worthy of additional discussion. Since all the information on the custom printed paper ballot is identical to the electronic data associated with the unique ballot identification code (both in the initial tally and the scanned verification of the results), this data can be made available to the public through an internet link into the central data base compiled by the headquarters computing unit or could be limited to certain public locations, such as election boards or county clerks offices. By going to this web site or appropriate terminal connected to the central data base, the voter can enter the ballot identification code printed on his receipt and verify that his intended votes were properly counted in both the initial tally and the scanned count. Since there is no voter information linked to the ballot identification code, there is no risk that anyone else can determine how each voter voted, unless another person gains access to another voter's ballot receipt. In most cases, however, this receipt will be quickly destroyed since it has little value except to most highly suspicious voters. This option would provide a means for voters to have increased confidence in the integrity of the state's voting system.

Since this voting system incorporates computer technology, it can also easily accommodate the casting of absentee ballots. Voters applying for an absentee ballot could be provided with a unique absentee ballot number. Using an internet connection, they can then go to the precinct web site and make their selections. Upon entering their unique absentee ballot number, they can then indicate to the precinct computing unit or the headquarters computing unit that this selection should be recorded as a properly cast absentee ballot. In addition, if required by the law, a paper copy of the ballot could be printed out and mailed to election officials in the prescribed manner for the purpose of confirming the electronically cast vote.

The use of a computer controlled voting system also provides an easy means for incorporating additional security measures at the precincts. For example, the precinct computing unit can be pre-programmed to refuse to allow the casting of any votes or printing of any ballots except under predefined conditions, such as entry of passwords or presentation of tokens by the required number of election judges, including representatives of various political parties. By this same manner, a precinct election judge witnessing fraud could remove his token or disable his password to register a protest or to actually stop the casting of votes.

The precinct computing unit can also be pre-programmed to start and stop accepting the casting of ballots at precisely the predefined times as determined by its internal clock. Furthermore, since in some embodiments of this invention, the precinct computing unit is in communication with the headquarters computing unit, in the event that election officials or a court order determines that voting times should be extended or reduced, this instruction could be conveyed to the precinct computing unit by the headquarters computing unit. These and similar provisions for defining the conditions surrounding the voting process can be provided for in a manner consistent with local law through programming methods familiar to those skilled in the art.

It is most noteworthy that this voting system offers multiple levels of verification and redundancy for recovery of votes that might otherwise be spoiled. First, the scanned count of the paper ballots is a mechanism of confirming that the electronic tally has not been altered by hackers or corrupt election officials or employees. Second, if a large number of voters are suspicious that their votes are not being properly counted, they can use their receipts to verify how the votes are recorded in the publicly available records. During a fraud investigation, receipt numbers could be entered into the scanning equipment to automatically identify and segregate ballots about which there is suspicion or concern.

Furthermore, if allowed by state law, in the event that a precinct ballot box is lost or destroyed, the electronic tally of votes from that precinct could be certified as an accurate substitute for the destroyed paper ballots. Conversely, if the electronic records are corrupted or destroyed, at either the precinct level or at the headquarters computing unit, the printed paper ballots are still available for generating an accurate count of the results.

Moreover, there is redundancy built into the custom printed ballots themselves. If a the machine readable code for a particular vote 22 is marred or unreadable, the alphanumeric representation 22 can be scanned by machine or read by election judges to determine the voters intent. The voter's intent can also be determined by reference to the unique ballot identification number 23 by which the votes associated with this ballot can be retrieved from the digital records corresponding to the cast ballot. To add an additional level of protection, this ballot identification number would typically include a checksum that could be used, at least in a high percentage of cases, to identify and correct illegible characters.

Still another level of redundancy could be provided by printing on each ballot a copy of the non-unique selection code that corresponds to the code that a voter would use in casting a pre-selected slate of votes, as described above.

Through these multiple records (a printed name, a candidate code, a ballot identification code, a pre-selected slate code, and an electronic record of all the information associated with each cast ballot) it would be possible to recover and verify the votes cast from even a severely damaged ballot.

All these redundancies would make election fraud extremely difficult without the collusion of both election judges and state election officials. Irregularities in the printed ballots and the original electronic tally records are easily identified and can be pinpointed to the level of individual precincts and even individual ballots.

The flexibility of this system allows state and local voting officials many alternatives for establishing voting procedures. The forgoing description is not intended to limit the procedures or variations thereof which might be employed in the use of this invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus comprising a computing unit, an entry device, and a printer, the computing unit being operatively connected to the entry device and to the printer, the computing unit being programmed to respond to the selection of one of the first and second voting choices entered into the entry device by a voter in a manner causing the printer to print a tangible record having indicia thereon, the indicia comprising voter readable text, the text having a configuration that is dependent upon the one voting choice selected by the voter and excluding the second voting choice that was not selected, and including programming for the computing unit to cause the printer to print voiding indicia on the tangible record in the event that after reviewing the tangible record the voter chooses to void at least one voting choice printed on the tangible record.

2. The apparatus of claim 1 wherein the printer includes a paper feeding device which feeds paper into the printer whereby the paper will be imprinted with the indicia to form the tangible record.

3. The apparatus of claim 1 wherein the printer includes a paper feeding device which feeds paper into the printer which will be imprinted with the indicia to form the tangible record and out of the printer so as to provide the voter with an opportunity to view the tangible record and to verify therefrom that the text of the indicia is indicative of the voting choice that was selected by the voter.

4. The apparatus of claim 1 wherein the computing unit has memory in which is stored an electronic record of at least one of the voting choices entered into the entry device.

5. A voting system comprising a computing unit, an entry device, a printer, and at least one paper record, the computing unit being operatively connected to the entry device and to the printer, the computing unit being programmed to respond to the selection of a plurality of voting choices entered into the entry device by a voter in a manner causing at least one paper record to be imprinted with indicia by the printer and displayed to the voter for confirmation of the selected choices, the indicia comprising voter readable text descriptive of each voting choice entered into the entry device and omitting any text descriptive of voting choices that were not selected, and programming for the computing unit to use the printer to imprint the paper record with indicia voiding at least one selected choice in the event that, after reviewing the paper record, the voter chooses to void at least one selected choice.

6. The system of claim 5, wherein the printer includes a paper feeding device which feeds paper into the printer whereby the paper will be imprinted with the indicia to form the paper record.

7. The system of claim 5, wherein the printer includes a paper feeding device which feeds paper into the printer which will be imprinted with the indicia to form the paper record and out of the printer so as to provide the voter with an opportunity to view the paper record and to verify therefrom that the text of the indicia is indicative of each voting choice entered into the entry device.

8. The system of claim 5, including a record keeping container proximate the printer in which the paper record may be deposited after the voter has had an opportunity to view the paper record and to verify therefrom that the appearance of the text of the indicia is indicative of each voting choice entered into the entry device.

9. The system of claim 5, including a record keeping container proximate the printer in which the paper record may be deposited after the voter has had an opportunity to view the paper record and has determined from the text of the indicia that the paper record is not indicative of the voter's desired choices.

10. A system of voting in an ejection that has a plurality of voting choices among which selection may be made, the system comprising: a computing unit, an entry device and a printer, the computing unit being operatively connected to the entry device and to the printer, the computing unit being programmed to respond to the selection of at least one of a plurality of voting choices entered into the entry device by a voter in a manner causing the printer to print indicia on a paper record readable by the voter, the printed indicia comprising text describing the selected voting choice, the text of the selected voting choice being in a font that is unambiguously different from any text that may be printed in regard to the unselected voting choices, and programming for the computing unit to use the printer to imprint the paper record with indicia voiding at least one selected choice in the event that, after reviewing the paper record, the voter selects a voiding choice entered into the entry device.

11. The system of claim 10, wherein no text is printed in regard to the unselected voting choices and the printer includes a paper feeding device which feeds paper into the printer whereby the paper will be imprinted with the indicia to form the paper record.

12. The system of claim 10, wherein the printer includes a paper feeding device which feeds paper into the printer which will imprint the paper with indicia to form the paper record and feeds the paper record out of the printer so as to provide the voter with an opportunity to view the paper record and to verify therefrom that the configuration of the text of the indicia is indicative of the voting choices entered into the entry device.

13. The system of claim 10, including a record keeping container proximate the printer in which the paper record may be deposited after the voter has confirmed that the configuration of the text is indicative of the voting choices desired by the voter.

14. A system for creating a voter verifiable printed record of votes cast during an election, comprising:

a computing unit with program instructions and electronic memory;

an entry device operatively connected to the computing unit for a voter to select from a plurality of voting choices and further including an input option to void at least one previously selected voting choice;

a printer responsive to the computing unit;

a source of paper, in the printer, onto which will be printed indicia comprising text readable to the voter that is indicative of the selected voting choices and any voided voting choices, the appearance of the text being dependent on the voting choices entered into the entry device, such that the text printed on the printed paper serves as a printed record of the votes cast by the voter; and a paper feeding device to present the paper, bearing the printed indicia, and advancing from the printer, to the view of the voter for verification of the accuracy of the printed indicia.

15. The system of claim 14, wherein the computing unit has an electronic memory in which is stored an electronic record of selections made using the entry device.

16. A method of voting in an election that has a plurality of voting choices to select between, the method comprising: providing at least one computing unit with an input device and printer device; permitting a voter to select at least one of a plurality of voting choices via the input device; utilizing the printer device to print indicia that is indicative of the at least one selected voting choice in a manner creating a tangible record; permitting the voter to view the tangible record; providing the voter a voiding option; and in the event that the voter chooses the voiding option, utilizing the printer device to print indicia indicative of the voiding of at least one selected voting choice in an unambiguous fashion that is readable by the voter and election judges.

17. The method of claim 16, further providing the computing unit with electronic memory in which is stored an electronic record of the voting choices selected via the input device.

18. The method of claim 16 including a paper feeding device operatively connected to the printer to advance the tangible record through the printer to present the tangible record to the view of the voter for verification of the accuracy of the printed indicia; providing a source of paper operatively controlled by the paper feeding device and using the paper as the material imprinted by the printer with indicia that is indicative of at lease one selected voting choice in a manner creating a tangible record; and providing a record keeping container proximate the printer in which the tangible record is retained after the voter has had an opportunity to confirm that the tangible record accurately reflects the voter's intent.

* * * * *